Figure 1:
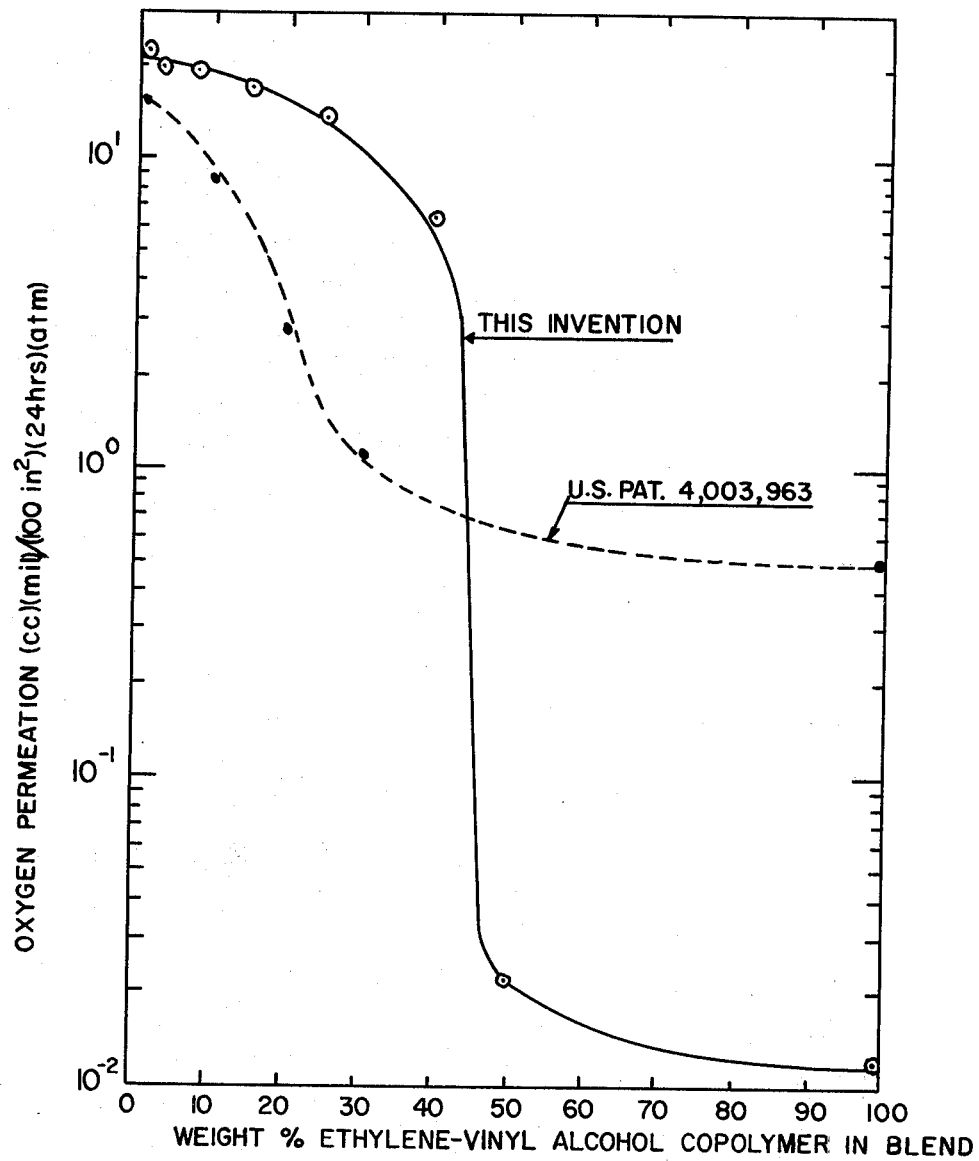

United States Patent [19]
Cancio et al.

[11] 4,284,671
[45] Aug. 18, 1981

[54] POLYESTER COMPOSITIONS FOR GAS AND MOISTURE BARRIER MATERIALS

[75] Inventors: Leopoldo V. Cancio; Gerald W. Miller; Pai-Chuan Wu, all of Cincinnati, Ohio

[73] Assignee: Clopay Corporation, Cincinnati, Ohio

[21] Appl. No.: 38,094

[22] Filed: May 11, 1979

[51] Int. Cl.³ .................... B65D 00/00; B32B 27/06
[52] U.S. Cl. .................................. 428/35; 428/481; 428/290; 525/56; 525/58
[58] Field of Search ............... 428/35, 483, 290, 481; 525/56, 58

[56] References Cited

U.S. PATENT DOCUMENTS

| | | | |
|---|---|---|---|
| 3,585,177 | 6/1971 | Gardner et al. | 525/57 |
| 4,003,963 | 1/1977 | Creasy et al. | 525/57 |
| 4,082,854 | 4/1978 | Yamada et al. | 428/35 |

Primary Examiner—Lucille M. Phynes
Attorney, Agent, or Firm—Wood, Herron & Evans

[57] ABSTRACT

Polymer blends of a polyester and polyvinyl alcohol, or their copolymers, may be fabricated into barrier packaging materials having very low permeabilities to oxygen, other fixed gases and moisture.

13 Claims, 2 Drawing Figures

THIS INVENTION—EVAL+PETG
U.S. PAT. 4,003,963—ETHYLENE-VINYL ALCOHOL+PVC

# POLYESTER COMPOSITIONS FOR GAS AND MOISTURE BARRIER MATERIALS

BACKGROUND OF THE INVENTION

Poly(vinyl alcohol) and its copolymers are known to possess low permeabilities to gases. However, the use of these materials for packaging in their native form restricts their use in moisture-containing atmospheres due to the presence of the many hydroxyl groups in the polymer. Further, permeabilities to oxygen, carbon dioxide and other fixed gases are very low, and increase exponentially as a function of the relative humidity. Polyolefin copolymers exhibit the sensitivity to humidity to a lesser degree. Commercial packaging and other barrier materials require low permeabilities to gases and moisture. A recent proposal to overcome this problem was disclosed in U.S. Pat. No. 4,003,963 by using certain mixtures of poly(vinyl chloride) and poly(vinyl alcohol) copolymers. The vinyl chloride polymer containing no carboxyl groups was blended with about 10-30 percent by weight, based on the weight of vinyl chloride polymer, of an ethylene/vinyl alcohol copolymer containing greater than about 61 weight percent or 50 mole percent of vinyl alcohol as comonomer.

Another approach to the problem is disclosed in U.S. Pat. No. 3,585,177. According to this patent, a lower alpha olefin/vinyl alcohol copolymer is prepared having a residual ester content below 3 percent and an olefin content between 5 and 40 percent by weight. Differential thermal analysis was used to show that the copolymers have a single narrow endotherm with a melting range of less than 30° C. Other combinations in the art of barrier compositions are blends of inexpensive materials with those materials having good barrier properties. Such possibilities are limited by the incompatibilities of such blends.

SUMMARY OF THE INVENTION

This invention pertains to polymer blends of a poly(ester) and poly(vinyl alcohol), or their copolymers, as barrier packaging compositions. In particular, compositions having enhanced resistance to gas permeability and moisture-vapor transmission are provided by this invention.

This invention is predicated in part upon the discovery of barrier compositions comprising a mixture of poly(ester) homopolymer or copolymer and poly(vinyl alcohol) or an ethylene/vinyl alcohol copolymer. It has been found that a blend of a polyester and at least about 10% by weight of poly(vinyl alcohol) or an ethylene/vinyl alcohol copolymer, containing greater than about 61 weight percent or 50 mole percent of vinyl alcohol, provides a barrier packaging material with optimized gas permeability and moisture-vapor transmission.

Poly(ester) materials, particularly those which are characterized by combination of diols with terephthalic acid, such as poly(ethylene terephthalate), are typically moderate in their permeabilities to oxygen and moisture. Other copolyesters utilizing terephthalic and isophthalic acids with diols or mixtures thereof are also moderate to fair in their gas barrier properties. These particular materials may be formed from the free acid and a particular glycol, more notably ethylene or butylene glycol, or have been known to be formed through the condensation of phthalate esters with glycols resulting in a thermoplastic material having terminal carboxyl and hydroxyl groups. Examples of these polymers are poly(ethylene terephthalate), poly(butylene terephthalate), poly(ethylene terephthalate/isophthalate), and poly(ethylene glycol/cyclohexane dimethanol/terephthalate). Copolymers with other phthalic acids are also covered by this invention. A particularly preferred poly(ester) contains alternating units of terephthalic acid and ethylene glycol. This polyester is well known in the textile fiber, film and plastic bottle industries and usually possesses an intrinsic viscosity in the range of 0.55 to 2 deciliters. The subject polyesters can result from the copolymerization of terephthalic/isophthalic or phthalic acid or an ester derivative with a glycol such as ethylene glycol, propylene glycol, butylene glycol, cyclohexane dimethanol, neopentyl glycol, pentandiol and the like. Other aromatic acids may be used in place of the phthalic acids, such as benzophenone dicarboxylic acid, cyclopentane dicarboxylic acid, diphenylsulfone dicarboxylic acid, diphenylmethane dicarboxylic acid, propylene bis(phenyl carboxylic acid), diphenyloxide dicarboxylic acid and other aromatic diacids. Other polyesters include poly(tetramethylene terephthalate), poly(cyclohexane dimethanol terephthalate), polyethylene dibenzoate, copolyesters of terephthalic acid, an aliphatic dicarboxylic acid and a glycol, etc. Other dicarboxylic acids from which the resins can be derived are dicarboxylic acids such as oxalic acid, malonic acid, succinic acid, glutaric acid, adipic acid, pimelic acid, suberic acid, azelaic acid, sebacic acid, brassylic acid, thapsic acid, diethylsuccinic acid, isophthalic acid, terephthalic acid and hemimellitic acid. Thus, the term "poly(ester)" as used herein is intended to cover condensation products of the mentioned acids and polyols.

Poly(vinyl alcohol), or more simply "PVA" herein, is usually made by hydrolysis of poly(vinyl acetate), and can be obtained commercially with varying degrees of hydrolysis. The resulting polymers are copolymers of vinyl alcohol and vinyl acetate with contents of vinyl alcohol in excess of 80 weight percent. The ethylene/vinyl alcohol copolymers, or more simply "EVAL" herein, can be purchased or converted by hydrolysis to suitable ethylene/vinyl alcohol copolymers. The polymers described in this invention are hydrolyzed ethylene/vinyl alcohol copolymers or vinyl alcohol homopolymers, containing up to 10 percent by weight residual vinyl acetate. Vinyl alcohol copolymers containing greater than 50 percent vinyl alcohol as a copolymerizate can be converted into films with outstanding gas barrier resistance. Normally they are unsatisfactory because of their poor sensitivity to moisture. According to this invention, the moisture-vapor deficiency is remedied by blending the totally hydrolyzed poly(vinyl alcohol) or ethylene/vinyl alcohol copolymers with a polyester, such as poly(ethylene terephthalate), various copolymers, and other terephthalate polymers.

Another desirable feature of this invention is the use of a three component system of poly(ester), poly(vinyl alcohol) or a copolymer and plasticizer. Adding plasticizer usually tends to increase permeability of other polymer blends to oxygen. However, in the subject blends, such oxygen permeability occurs to a lesser degree than might be expected. Other polymer systems usually begin to lose barrier resistance to oxygen when levels of 5-10 percent plasticizer are incorporated. On the other hand, poly(ester) and poly(ethylene/vinyl alcohol) copolymer blends decrease in oxygen permeation only significantly when adding 20 percent plasticizer to the blend. Similar behavior has been shown in blends of poly(ester) with vinyl alcohol polymer and a plasticizer. Plasticizers, in these cases, are typically butyl benzyl phthalate, aromatic phosphates and other types of plasticizers well known to the trade for use with poly(vinyl chloride) and polar polymers. Most such plasticizers are esters of phthalic acid.

In another unique aspect, blends of this invention can be fabricated into films that are transparent. This is highly desirable for many food packaging applications utilizing film or bottles. If the poly(ester) resins are replaced by other thermoplastic resins, such as poly(ethylene), poly(styrene), poly(propylene) and styrene-acrylonitrile copolymers, the blends show gross incompatibilities, opacity and phase separation, evidenced by a tendency to delaminate and very poor barrier characteristics.

It has also been found that the coextrusion of the blended materials, as an inner barrier layer, provides a composition with extremely high resistance to moisture-vapor transmission and significantly low oxygen permeation so as to provide an optimized packaging material. For example, the coextrusion of three layers comprising a polyolefin outer layer, a middle layer containing a blend of poly(ester) and poly(vinyl alcohol) or ethylene/vinyl alcohol copolymer, and a second external layer of polyolefin, provides a composite with extremely low moisture-vapor transmission and oxygen transmission. Permeabilities for these composites show that the thickness of the center layer is critical to imparting high barrier properties to the three layer coextrudate.

In a broader aspect, compositions of a poly(ester) and a PVA, or their copolymers, have been found to provide excellent barrier materials. Such combinations might have been expected to be incompatible or poor barriers based upon inter-reaction of hydroxyl groups and/or carboxyl groups of such blends. However, it has not been found to be the case. Rather, excellent barrier properties have been achieved. Furthermore, it was considered wholly unexpected that compositions above 10 percent by weight of ethylene/vinyl alcohol copolymer or vinyl alcohol homopolymer would produce significant decreases in the permeability to oxygen, marked most notably by a sharp drop in permeability proceeding from about 40–50 percent by weight of an ethylene/vinyl alcohol copolymer with PETG, a poly(ester) copolymer of terephthalic acid, ethylene glycol and cyclohexane dimethanol (known as "PETG"). It has also been discovered that the ratios of poly(ester) and vinyl alcohol homopolymers and copolymers in these compositions are critical in order to obtain the proper balance of low oxygen permeation and low moisture-vapor transmission. Such blends also exhibit desirable mechanical properties, making them suitable for use in films, bottles, sheet materials and other packaging applications. Whereas ratios of components have been found critical for certain blends, it is to be understood within the teachings of this invention that in its broadest claimed aspect, blends of polymers, in general, should not be limited to specific ratios.

Figure 2:
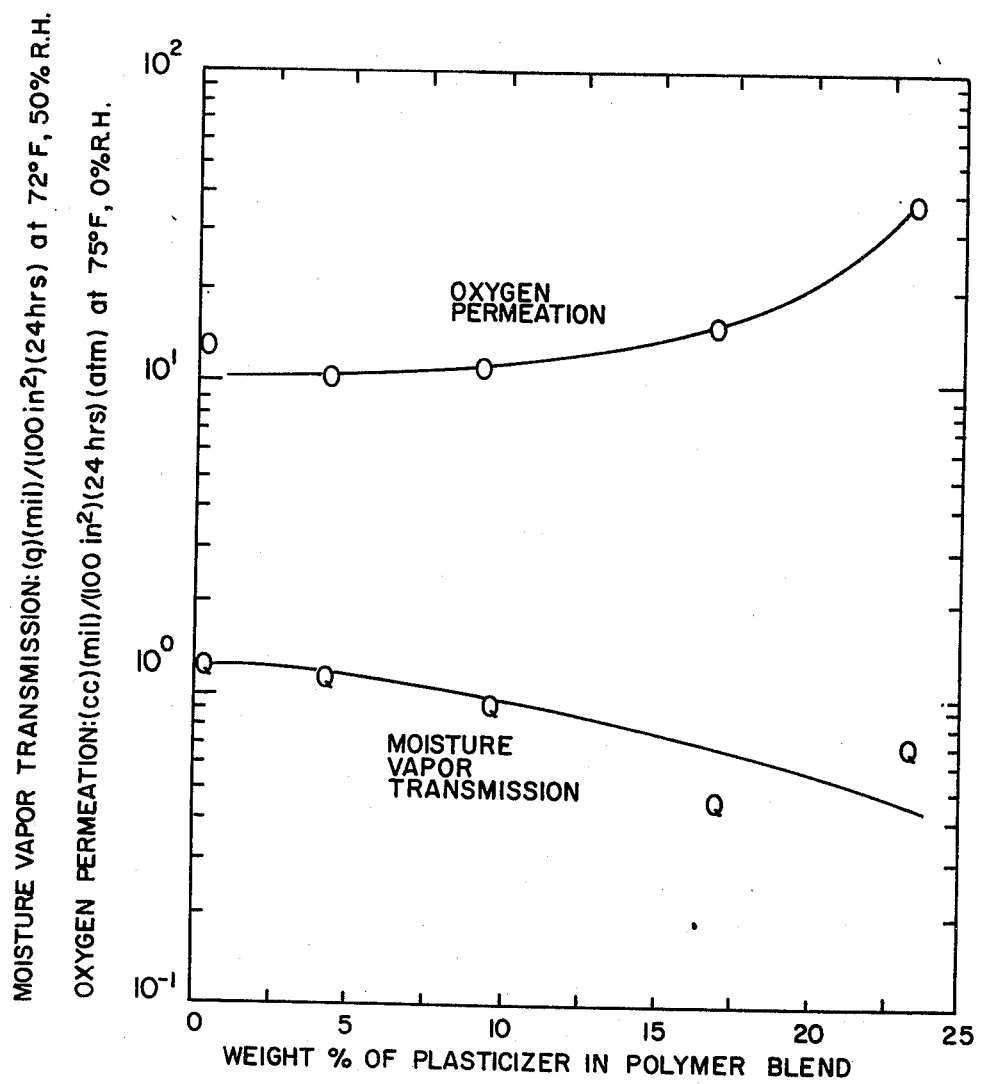

These and other embodiments will be further understood with reference to the following examples and drawings in which:

FIG. 1 is a diagram of the gas permeability of an EVAL and PETG composition of this invention in comparison to a composition of U.S. Pat. No. 4,003,963, and FIG. 2 is a diagram showing the effect of a plasticizer upon the barrier characteristics of an EVAL and PETG blend of this invention.

EXAMPLE I

Forty parts by weight of an ethylene/vinyl alcohol copolymer containing 18 percent ethylene and 82 percent vinyl alcohol, by weight, was blended in a Brabender extruder with 60 parts by weight of a poly(ester) copolymer made from terephthalic acid, ethylene glycol and cyclohexane dimethanol (known as PETG, available from Eastman Chemical). The resin blend was then pressed into a film by compression molding in a heated press. The oxygen permeability was measured as 6.8 cc-mil/100 in$^2$/24 hours/atm at 75° F./0%R.H. The moisture vapor-transmission was 0.5 g.-mil/100 in$^2$/24 hours at 75° F./50 percent R.H.

A complete series of varying ethylene/vinyl alcohol (EVAL) copolymers with PETG, by weight, exhibited the oxygen permeability and moisture-vapor transmission shown in FIG. 1. The poorer permeability of the poly(ester) is enhanced as the EVAL is added in an unexpected manner, showing a sharp drop in the range of about 40–50 percent EVAL. A plot of an unoriented PVC/ethylene-vinyl alcohol copolymer from the data in Table I of U.S. Pat. No. 4,003,963 shows a totally different behavior than this invention.

EXAMPLE II

Twenty-five parts by weight of an ethylene/vinyl alcohol copolymer containing 18 percent ethylene and 82 percent vinyl alcohol, by weight, was blended in a Brabender extruder with 75 parts by weight of a poly(ester) copolymer made from terephthalic acid, ethylene glycol and cyclohexane dimethanol (known as PETG, available from Eastman Chemical). The resin blend was then pressed into a film by compression molding in a heated press. The oxygen permeability measured 14 cc-mil/100 in$^2$/24 hours/atm at 75° F. The moisture-vapor transmission was 1.3 g-mil/100 in$^2$/24 hours at 75° F./10 percent R.H.

Another sample was made in which the ethylene/vinyl alcohol copolymer was replaced by fully hydrolyzed poly(vinyl alcohol) (PVA). After pressing this sample into a film, the oxygen permeability and moisture-vapor transmission results obtained are shown in Table I. The blending of PVA at this level showed a further decrease in oxygen permeability and a slight increase in moisture-vapor transmission, showing that both PVA and EVAL are equally effective in providing a gas barrier with no significant deterioration in the moisture-vapor transmission.

TABLE I

| POLYMER BLEND, WT. % | | | OXYGEN PERMEATION (cc) (mil) (100 in$^2$) (24 Hrs) (atm)(75° F. 0% R.H.) | MOISTURE-VAPOR TRANSMISSION (g) (mil) (100 in$^2$) (24 Hrs) (72° F., 50% R.H.) |
|---|---|---|---|---|
| PETG | EVAL | PVA | | |
| 75 | 25 | | 14 | 1.3 |
| 75 | | 25 | 10 | 2 |

The use of plasticizers of various types and at various concentrations showed little change in the transport properties as shown in Table II. The ability to plasticize PETG was surprising and particularly to see that the plasticized blends retained the same oxygen permeation using as much as 10-15 percent plasticizer (FIG. 2). SANTICIZER 160 and 141, are Monsanto trademarks for butyl benzyl phthalate and mixed cresyl diphenyl phosphates, respectively.

TABLE II

Effect of Plasticizer on Oxygen Permeability of Poly(ester)/Poly(vinyl alcohol) Blends

| Plasticized Polymer Blend, Parts | | | | | OXYGEN TRANSMISSION (cc) (ml)/ (100 in$^2$) (24 Hrs) (atm) 75° F., 0% R.H. |
|---|---|---|---|---|---|
| Polymer | | | Plasticizer | | |
| PETG | EVAL | PVA | Santicizer 160 | Santicizer 141 | |
| 75 | 25 | | 10 | | 12 |
| 70 | | 20 | 10 | | 8 |
| 70 | | 20 | | 10 | 12 |

EXAMPLE III

A blend of 25 parts by weight of fully hydrolyzed poly(vinyl alcohol), such as Air Products, VINOL-125, with 75 parts by weight of PETG was compared to a similar blend in which 25 parts PVA was blended with 75 parts by weight of poly(ethylene-terephthalate) (PET) with an intrinsic viscosity of 0.55 dl. The blends were pressed into films. The oxygen permeability of the films are shown in Table III.

TABLE III

OXYGEN PERMEABILITY OF TWO POLYESTERS WHEN BLENDED WITH POLY(VINYL ALCOHOL)

| Polymer Wt. % | $P_{O_2}$ (75° F., 0% R.H.) (cc) (mil) (100 in$^2$) (24 hrs) (atm) | $P_{H_2O}$ (72° F., 50% R.H.) (g) (mil) (100 in$^2$) (24 hrs) |
|---|---|---|
| 75 PET 25 PVA | 5.3 | 1.3 |
| 75 PETG 25 PVA | 10 | 2.0 |

EXAMPLE IV

Coextruded films were made, using the three layer configuration of:
(a) Outer layer—ethylene/vinyl acetate copolymer, containing 2 percent vinyl acetate by weight (EVA, 2% VA)
(b) Middle layer—a blend of 50 parts by weight each of PETG and EVAL
(c) Outer layer—same as (a).

Table IVa shows the effect of the 50/50 PETG/EVAL blend and varying its thickness on the oxygen permeability and moisture-vapor transmission of these films. The data show that increasing the thickness as a percent of total thickness decreases the oxygen permeability, but does not significantly change the moisture-vapor transmission.

The data in Table IVb, for a similar three layer film, using an 18 percent ethylene/82 percent vinyl alcohol EVAL as the center layer, show the same trend as that demonstrated by the poly(ester)/EVAL blend. The oxygen transmission data for the EVAL three layer film are only slightly less than those of the 50/50 EVAL-poly(ester) blend.

TABLE IV

IV a.

Multilayer Structure Thickness, Mils.

| Outer Layer EVA (Chemplex 1045) 2% VA | Center Layer Blend 50% PETG + 50% EVAL) | Inner Layer EVA (Chemplex 1045) 2% VA | Oxygen Transmission cc 100 in$^2$ 24 hrs atm 75° F., 0% R.H. | Moisture-Vapor Transmission g 100 in$^2$ 24 hrs (75° F., 50% R.H.) |
|---|---|---|---|---|
| 1 | 0.2 | 1 | 0.94 | 0.042 |
| 1 | 0.4 | 1.2 | 0.6 | 0.032 |
| 0.7 | 0.8 | 0.7 | 0.2 | 0.036 |

IV b.

Multilayer structure mils

| Outer Layer EVA (Chemplex 1045) 2% VA | Center Layer | Inner Layer EVA (Chemplex 1045) 2% VA | Oxygen-Transmission cc 100 in$^2$/24 hrs/atm 75° F., 0% R.H. | Moisture-Vapor Transmission g 100 in$^2$/day 72° F., 50% R.H. |
|---|---|---|---|---|
| 1 | 0.2 | 1 | 0.6 | 0.044 |
| 1 | 0.4 | 1 | 0.36 | 0.019 |
| 0.7 | 0.9 | 0.7 | 0.1 | 0.024 |

Referring to Tables IV(a) and (b), the coextrusion of the blended materials as an inner barrier layer provides a composition with extremely high resistance to moisture-vapor transmission and significantly low oxygen permeation so as to provide an optimized packaging material. For example, the coextrusion of three layers comprising a polyolefin outer layer, a middle layer containing a blend of poly(ester) and poly(vinyl alcohol) or ethylene/vinyl alcohol copolymer, and a second external layer of polyolefin, provides a composite with extremely low moisture-vapor transmission and oxygen transmission. Permeabilities for these composites are shown in Table IV, as a function of the thickness of the barrier layer, showing that the thickness of the center layer is critical to imparting high barrier properties to the three layer coextrudate.

Other modifications may be made in view of the above description as will become apparent to a person of ordinary skill in the art and without departing from the scope hereof.

We claim:

1. A gas and moisture barrier material fabricated into a structural layer comprising a polymer blend which consists essentially of
   (a) a polymer selected from the group of a polyester and copolymers thereof, and
   (b) poly(ethylene/vinyl alcohol).

2. The barrier material of claim 1 wherein the poly(ester) is selected from the group consisting of poly(ethylene terephthalate) and poly(butylene terephthalate).

3. The barrier material of claim 1 wherein said copolymer is made from terephthalic acid, ethylene glycol and cyclohexane dimethanol.

4. The barrier material of claim 3 wherein said poly(ethylene/vinyl alcohol) is in an amount from at least about 40 percent by weight.

5. The barrier material of claim 1 wherein said polyvinyl alcohol copolymer is present in an amount of at least about 10 percent by weight of said polyester and the polyester is less than about 90 percent by weight of the blend.

6. The barrier material of claim 5 wherein said polyvinyl alcohol copolymer has a weight percent of vinyl alcohol greater than about 60 percent.

7. The composition of claim 1 further comprising a plasticizer for the polymer blend in an effective plasticizing amount.

8. The composition of claim 7 wherein said plasticizer is an ester of phthalic acid.

9. A barrier material comprising a polymer blend of claim 1 fabricated into a structural layer and further comprising an additional structural layer consisting essentially of another thermoplastic polymer.

10. The barrier material of claim 9 wherein said thermoplastic polymer is selected from the group consisting of a polyolefin, a polyvinyl chloride polymer and copolymers thereof.

11. The barrier material of claim 1 which is extrusion coated onto a porous substrate for decreasing the moisture and gas permeability of the substrate.

12. The barrier material of claim 11 wherein said substrate is selected from the group consisting of a paper and a nonwoven fabric material.

13. A container formed from a layer of barrier material defined in claims 1, 2, 3, 4, 6 or 7.

* * * * *